(12) United States Patent
Xu et al.

(10) Patent No.: US 7,679,897 B2
(45) Date of Patent: Mar. 16, 2010

(54) COVER ASSEMBLY FOR STORAGE DEVICE

(75) Inventors: Chang-Zheng Xu, Shenzhen (CN); Qing-Hui Mi, Shenzhen (CN)

(73) Assignees: Hong Fu Jin Precision Indsutry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 121 days.

(21) Appl. No.: 11/952,136

(22) Filed: Dec. 7, 2007

(65) Prior Publication Data

US 2008/0289257 A1 Nov. 27, 2008

(30) Foreign Application Priority Data

May 22, 2007 (CN) .................. 2007 1 0200668

(51) Int. Cl.
*G06F 1/16* (2006.01)
*H05K 5/00* (2006.01)
*H05K 7/00* (2006.01)

(52) U.S. Cl. .................. 361/679.37; 361/679.33

(58) Field of Classification Search ............ 361/679.02, 361/679.33, 679.37; 312/223.2; 206/576
See application file for complete search history.

(56) References Cited

U.S. PATENT DOCUMENTS

| | | | | |
|---|---|---|---|---|
| 5,574,625 A * | 11/1996 | Ohgami et al. | ........... | 312/223.2 |
| 5,769,159 A * | 6/1998 | Yun | .......... | 361/692 |
| 5,912,870 A * | 6/1999 | Kanno et al. | ........... | 720/643 |
| 5,926,916 A * | 7/1999 | Lee et al. | ........... | 312/324 |
| 6,130,822 A * | 10/2000 | Della Fiora et al. | ........ | 361/724 |
| 6,181,557 B1 * | 1/2001 | Gatti | .............. | 361/679.48 |
| 6,588,624 B1 * | 7/2003 | Connors et al. | .......... | 220/827 |
| 6,603,655 B2 * | 8/2003 | Hrehor, Jr. et al. | ........ | 312/223.1 |
| 6,834,919 B1 * | 12/2004 | Mariano | .......... | 312/223.2 |
| 6,967,832 B2 * | 11/2005 | Mariano | .......... | 312/223.2 |
| 7,055,160 B1 * | 5/2006 | Tan et al. | .......... | 49/323 |
| 7,139,167 B2 * | 11/2006 | Yang | .......... | 312/223.2 |
| 7,265,971 B2 * | 9/2007 | Chen et al. | .......... | 361/679.55 |
| 7,327,566 B2 * | 2/2008 | Zhao | .......... | 361/679.33 |
| 7,367,638 B2 * | 5/2008 | Marroquin et al. | ...... | 312/223.2 |
| 2005/0046316 A1 * | 3/2005 | Chen et al. | .......... | 312/223.2 |
| 2005/0067923 A1 * | 3/2005 | Mariano | .......... | 312/223.2 |
| 2006/0245159 A1 * | 11/2006 | Lin et al. | .......... | 361/685 |
| 2008/0024969 A1 * | 1/2008 | Sun et al. | .......... | 361/679 |

* cited by examiner

*Primary Examiner*—Jayprakash N Gandhi
*Assistant Examiner*—Adrian S Wilson
(74) *Attorney, Agent, or Firm*—Frank R. Niranjan

(57) ABSTRACT

A cover assembly includes a panel defining an opening therein for allowing a storage device to move in or out therethrough, a cover shielding the opening, a connecting member, and an elastic member. The connecting member is pivotably connected to the panel through a first pivoting mechanism formed therebetween along a first axis, and is pivotably connected to the cover through a second pivoting mechanism formed therebetween along a second axis separate from and parallel with the first axis. The elastic member is arranged between the cover and the connecting member, for restoring the cover to shield the opening of the panel.

11 Claims, 5 Drawing Sheets

COVER ASSEMBLY FOR STORAGE DEVICE

BACKGROUND

1. Field of the Invention

The present invention relates to cover assemblies, and more particularly to a cover assembly for a storage device.

2. Description of Related Art

An electronic apparatus, such as a typical desktop computer, tower computer, server, or the like, usually includes storage devices, such as compact disk read-only memory (CD-ROM) drives, digital video disc (DVD) drives, floppy disk drives, and the like. A panel of the electronic apparatus typically defines an opening for receiving the corresponding storage device, and a cover is typically installed on the panel sheltering the opening for preventing dust entering therein. The cover forms pivots at opposite ends thereof to pivotably connect the cover to the panel. A spring is connected between the cover and the panel to restore the cover after the cover is opened relative to the panel. However, because the pivots are formed at ends of the cover, when the size of the cover is larger than that of the opening of the panel, the panel should define other recesses communicating with the opening to fit the cover. It is troublesome, and the connection of cover to the panel is awkward.

What is needed, therefore, is a cover assembly to conveniently and agilely shelter an opening of a panel.

SUMMARY

An exemplary cover assembly includes a panel defining an opening therein for allowing a storage device in or out therethrough, a cover shielding the opening, a connecting member, and an elastic member. The connecting member is pivotably connected to the panel through a first pivoting mechanism formed therebetween along a first axis, and is pivotably connected to the cover through a second pivoting mechanism formed therebetween along a second axis separate from and parallel with the first axis. The elastic member is arranged between the cover and the connecting member, for restoring the cover to shield the opening of the panel.

Other advantages and novel features will become more apparent from the following detailed description of embodiments when taken in conjunction with the accompanying drawings, in which:

DETAILED DESCRIPTION

Figure 1:
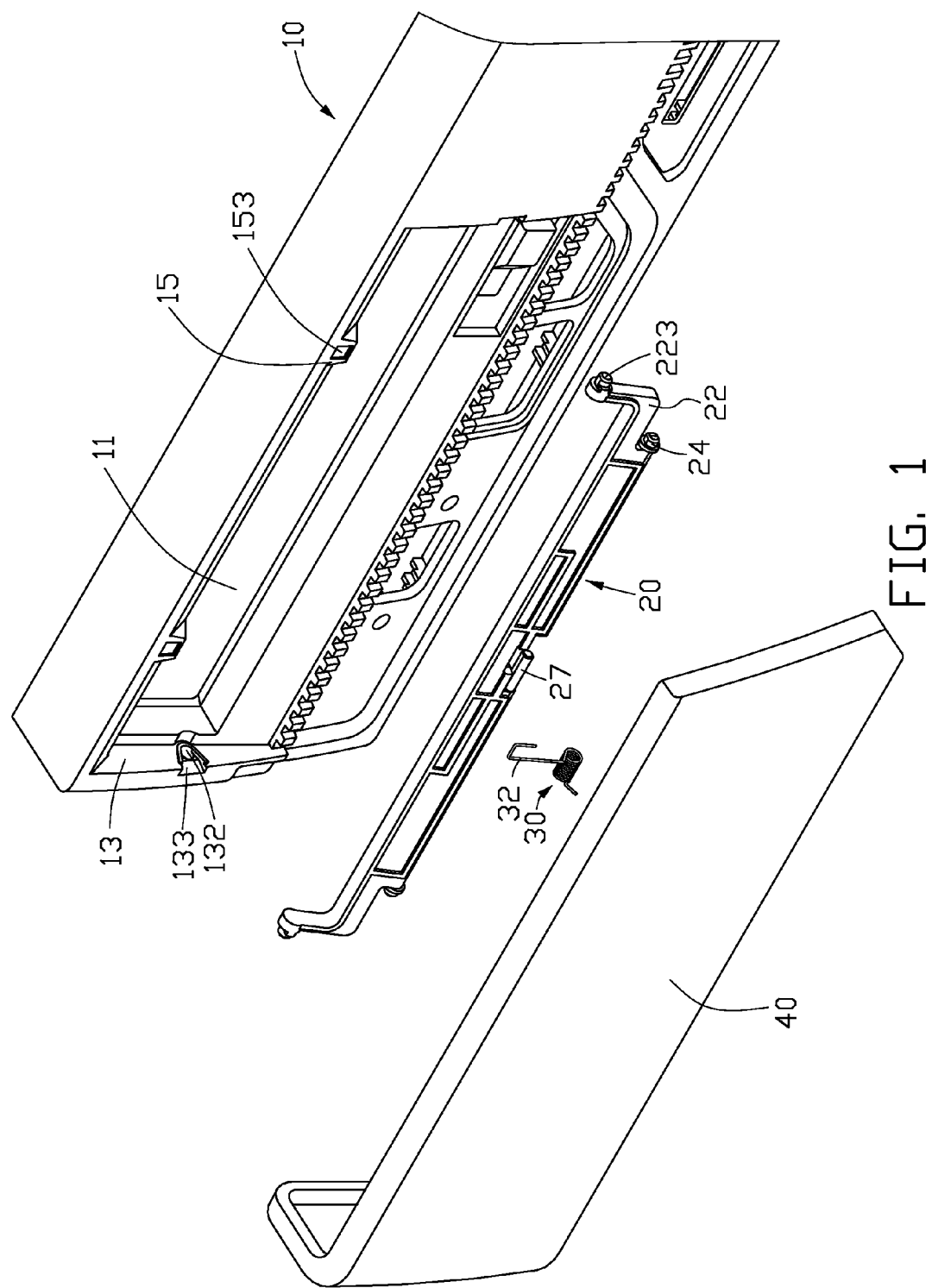
FIG. 1 is an exploded, isometric view of a cover assembly in accordance with an embodiment of the present invention, the cover assembly includes a panel, a connecting member, and a cover.
Figure 2:
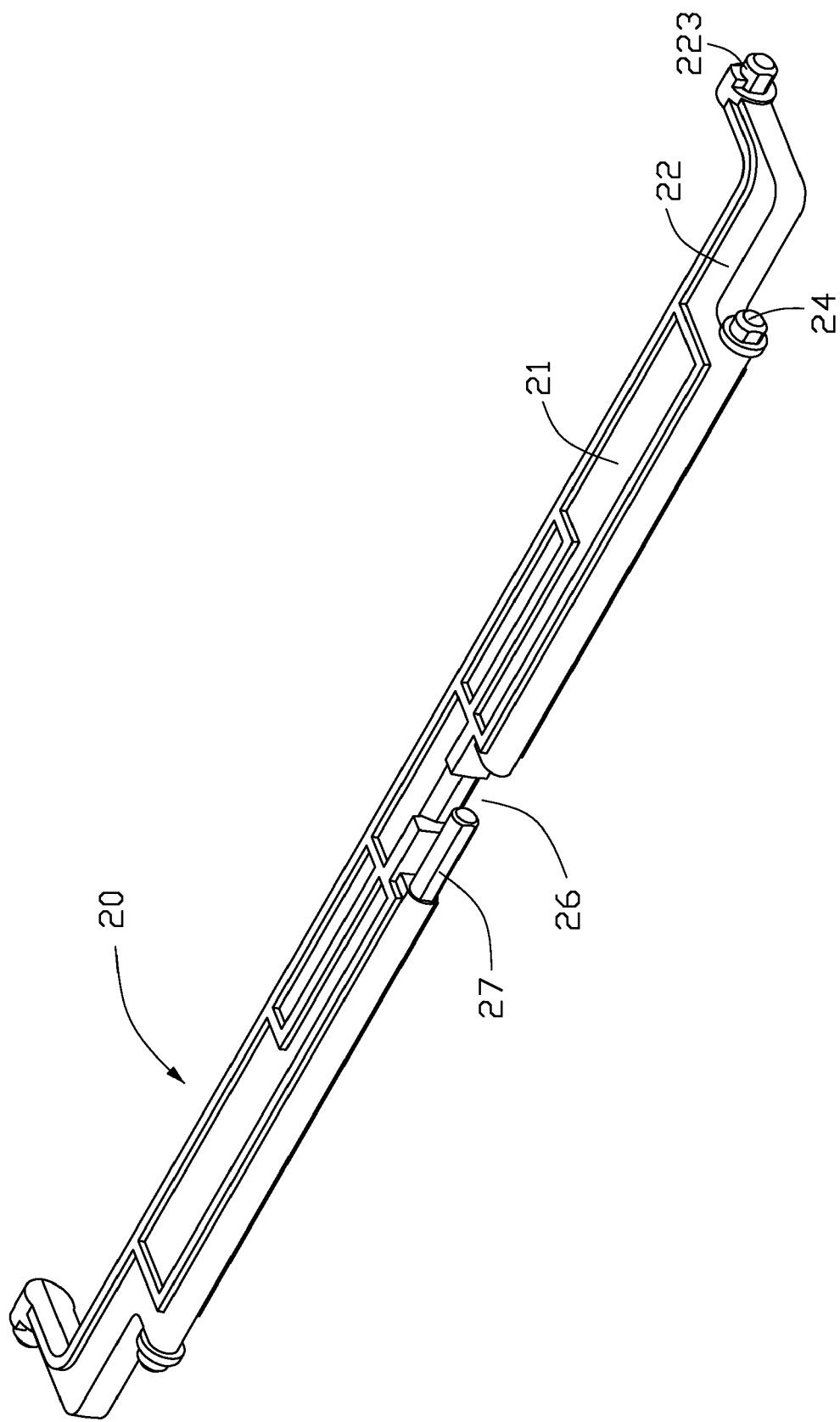
FIG. 2 is an enlarged isometric view of the connecting member of FIG. 1, but viewed from another aspect.

Referring to FIGS. 1 and 2, a cover assembly is provided in accordance with an embodiment of the present invention for shielding an opening of an electronic apparatus. The cover assembly includes a panel 10, a connecting member 20, an elastic member 30, and a cover 40. In this embodiment, the elastic member 30 is a torsion spring.

The panel 10 is mounted on a front of the electronic apparatus. The panel 10 defines an opening 11 for allowing a tray of a compact disk read-only memory (CD-ROM) drive in or out. The panel 10 forms two opposite sidewalls 13 bounding two sides of the opening 11 therebetween. Each sidewall 13 defines a pivoting hole 132, and a slanted surface 133 adjoining the pivoting hole 132 is formed on a joint of the sidewall 133 and the front portion of the panel 10. Two spaced latching portions 15 are formed on a section of the panel 10 above the opening 11. Each latching portion 15 defines a recess 153.

The connecting member 20 includes an elongated main body 21. The connecting member 20 includes two opposite end surfaces perpendicular to a longitudinal axis of the main body 21. Two generally L-shaped arms 22 extend outward and then upward from upper portions of the end surfaces of the main body 21 respectively. A first pivot 223 parallel with the longitudinal axis of the main body 21 extends from a free end of each arm 22. A second pivot 24 perpendicularly extends from a lower portion of each end surface of the main body 21. A bottom portion of the main body 21 defines a receiving slot 26. A post 27 extends from a portion of the main body 21 bounding the receiving slot 26 into the receiving slot 26. The post 27 is oriented generally along a longitudinal axis of the receiving slot 26 and is for the elastic member 30 to be placed therearound.

Figure 3:
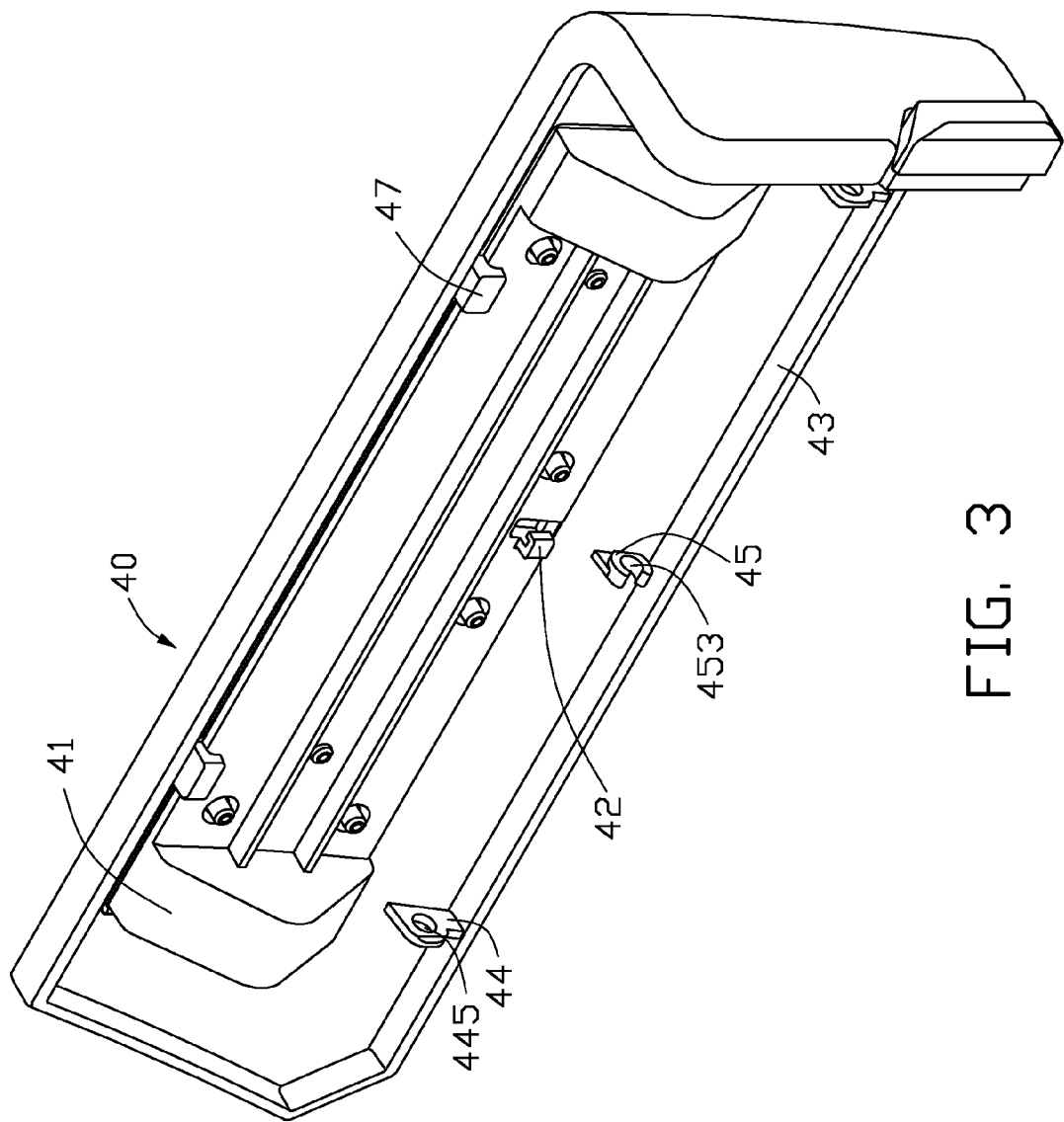
FIG. 3 is an enlarged isometric view of the cover of FIG. 1, but viewed from another aspect.

Referring to FIG. 3, the cover 40 is larger than the opening 11 of the panel 10. Two spaced arcuate protrusions 41 protrude from a backside of the cover 40. An elongated plate 43 extends backward from a bottom portion of the cover 40, and two spaced fixing plates 44 each defining a fixing hole 445 are formed on the plate 43 adjoining the backside of the cover 40. A positioning portion 45 is formed on a lower portion of the backside of the cover 40 between the fixing plates 44. The positioning portion 45 is generally C-shaped with the open part 453 facing away from the cover 40, and the fixing holes 445 are coaxial to the open part 453 of the C-shape positioning portion 45. A hook 42 protrudes from the backside of the cover 40 above the positioning portion 45. Two spaced blocks 47 protrude from an upper portion of the backside of the cover 40, corresponding to the latching portions 15 of the panel 10.

Figure 4:
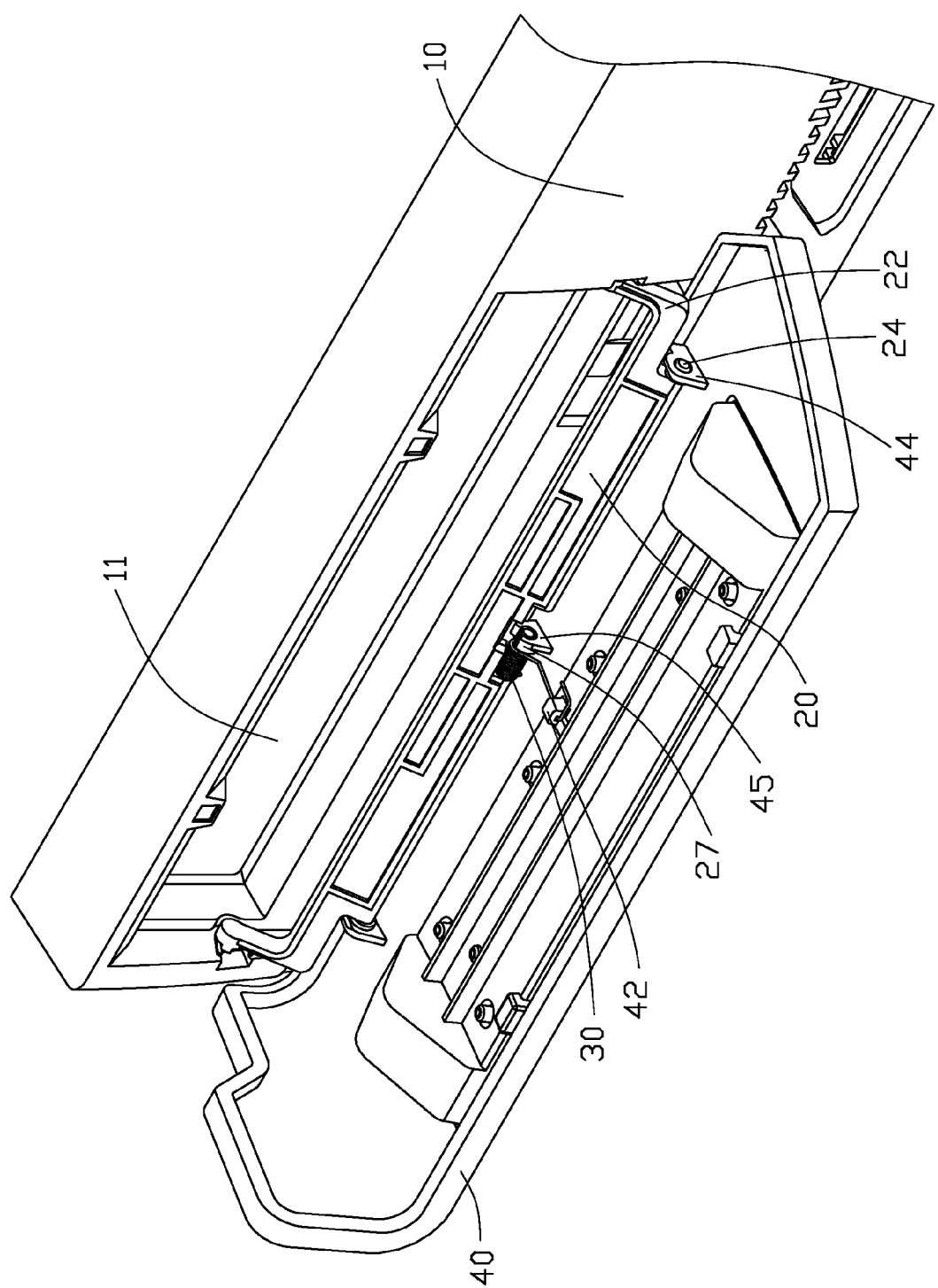
FIG. 4 is an assembled view of FIG. 1, the cover is opened relative to the panel.
Figure 5:
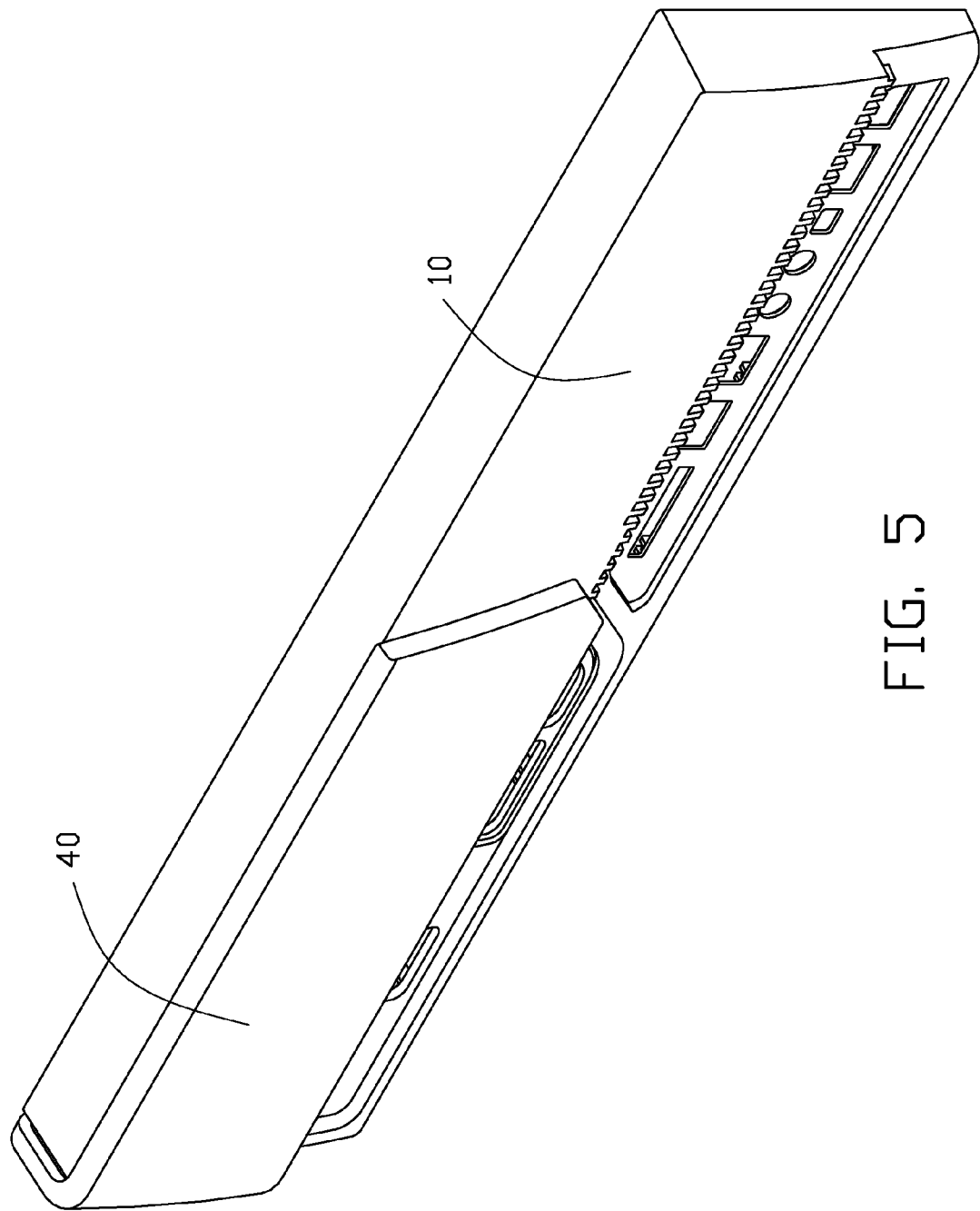
FIG. 5 is an assembled view of FIG. 1, the cover is closed to the panel.

Referring further to FIG. 4, in assembly, the elastic member 30 is placed around the post 27 of the connecting member 20. One of the second pivots 24 is inserted into the fixing hole 445 of the corresponding one of the fixing plates 44 of the cover 40. The connecting member 20 is rotated to make the post 27 align with the open part 453 of the positioning portion 45 of the cover 40. The other fixing plate 44 of the cover 40 is pulled outward, the connecting member 20 is pressed to squeeze the post 27 to be received in the open part 453 of the positioning portion 45, and the other second pivot 24 aligns with the corresponding fixing hole 445 of the other fixing plate 44. Releasing the other fixing plate 44, the other second pivot 24 engages in the corresponding fixing hole 445 of the other fixing plate 44, thereby the connecting member 20 is pivotably connected to the backside of the cover 40. One end of the elastic member 30 is fixed to the connecting member 20, and a hooking portion 32 extending from the other end of the elastic member 30 catches the hook 42 of the cover 40. Thereafter, the connecting member 20 is pushed toward the panel 10. The first pivots 223 of the arms 22 slide along the slanted surfaces 133 respectively, and then engage in the pivoting holes 132 of the panel 10 respectively. Thereby the connecting member 20 together with the cover 40 is pivotably connected to the panel 10. Generally, the cover 40 covers the opening 11 of the panel by the elastic force of the elastic member 30, and the blocks 47 of the cover 40 engage in the recesses 153 of the latching portions 15 of the panel 10 respectively.

When the tray of the CD-ROM drive is extended out from the electronic apparatus, the tray pushes the protrusions 41 of the cover 40 outward. The cover 40 is rotated away from the panel 10 around the second pivots 24 of the connecting member 20. The elastic member 30 deforms, and the connecting member 20 is rotated together with the cover 40, with the first pivots 223 of the connecting member 20 pivoting in the pivoting holes 132 of the panel 10 respectively, until the tray is completely extended from the opening 11 of the panel 10.

When the tray of the CD-ROM drive is retracted into the electronic apparatus, the elastic member 30 is restored to pull the cover 40 to rotate toward the panel 10 around the second pivots 24 of the connecting member 20. The connecting member 20 is rotated together with the cover 40, with the first pivots 223 of the connecting member 20 pivoting in the pivoting holes 132 of the panel 10 respectively, until the tray is completely received in the electronic apparatus, and the blocks 47 of the cover 40 engage in the recesses 153 of the latching portions 15 of the panel 10 respectively. Thereby, the cover 40 is closed to the panel 10.

In this embodiment, the first pivots 223 of the connecting member 20 cooperate with the pivoting holes 132 of the panel 10 to form a first pivoting mechanism, for pivotably connecting the connecting member 20 to the panel 10; the second pivots 24 of the connecting member 20 cooperate with the fixing holes 445 of the fixing plates 44 of the cover 40 to form a second pivoting mechanism, for pivotably connecting the cover 40 to the connecting member 20.

In other embodiments, in the first pivoting mechanism, positions of the first pivots 223 and the pivoting holes 132 may be exchanged with each other; in the second pivoting mechanism, positions of the second pivots 24 and the fixing holes 445 may be exchanged with each other, or the fixing plates 44 of the cover 40 may be replaced by L-shaped pivots respectively.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A cover assembly for a storage device, the cover assembly comprising:
a panel defining an opening therein for accessing the storage device;
a cover shielding the opening;
a connecting member pivotably connected to the panel through a first pivoting mechanism formed therebetween along a first axis, and pivotably connected to the cover through a second pivoting mechanism formed therebetween along a second axis separate from and parallel with the first axis; and
an elastic member for restoring the cover to shield the opening of the panel, two ends of the elastic member fixed to the cover and the connecting member respectively, wherein a post extends from the connecting member, a hook protrudes from a backside of the cover, the elastic member is a torsion spring, the torsion spring is placed around the post of the connecting member, one end of the torsion spring is fixed to the connecting member, and a hooking portion extending from the other end of the torsion spring catches the hook of the cover.

2. The cover assembly as claimed in claim 1, wherein the panel forms two opposite sidewalls bounding two sides of the opening therebetween, two generally L-shaped arms extend outward and upward from upper portions of two opposite end surfaces of the connecting member respectively, the first pivoting mechanism comprises two pivoting holes respectively defined in the sidewalls of the panel, and two first pivots parallel with the connecting member respectively extending from free ends of the arms for engaging in the corresponding pivoting holes of the panel.

3. The cover assembly as claimed in claim 2, wherein a slanted surface is formed on a joint of a front portion of the panel and each of the sidewalls adjoining the pivoting holes respectively.

4. The cover assembly as claimed in claim 2, wherein two spaced fixing plates are formed on the backside of the cover, the second pivoting mechanism comprises two fixing holes defined in the fixing plates respectively, and two second pivots perpendicularly extending from lower portions of the end surfaces of the connecting member respectively for engaging in the corresponding fixing holes of the fixing plates.

5. The cover assembly as claimed in claim 4, wherein the cover forms an elongated plate extending backward from a bottom portion thereof, and the fixing plates are formed on the plate adjoining the backside of the cover.

6. The cover assembly as claimed in claim 1, wherein a C-shaped positioning portion is formed on the backside of the cover, the open part of the C-shaped positioning portion facing away from the cover, a bottom portion of the connecting member defines a receiving slot, the post extends from a portion of the connecting member bounding the receiving slot into the receiving slot, the post engages in the open part of the C-shaped positioning portion.

7. The cover assembly as claimed in claim 1, wherein two spaced latching portions are formed on a section of the panel above the opening, each of the latching portions defines a recess, two blocks protrude from a backside of the cover for engaging in the corresponding recesses of the latching portions.

8. A cover assembly for a storage device, the cover assembly comprising:
a panel defining an opening therein for allowing the storage device to move in or out therethrough, the panel forming two opposite sidewalls inward bounding two sides of the opening, and each of the sidewalls defining a pivoting hole therein;
a connecting member comprising a pair of arms extending upward from two opposite ends thereof, two first pivots parallel with the connecting member extending from the arms respectively, and two second pivots separated from and parallel with the first pivots extending from the ends of the connecting member respectively, the connecting member pivotably connected to the panel with the first pivots engaging in the corresponding pivoting holes of the panel; and
a cover forming two spaced fixing plates on a backside thereof, each of the fixing plates defining a fixing hole, the cover pivotably connected to the connecting member for shielding the opening of the panel with the second pivots engaging in the corresponding fixing holes of the cover, wherein a post parallel with the connecting member extends from the connecting member, an elastic member is placed around the post of the connecting member for restoring the cover to shield the opening of the panel, one end of the elastic member is fixed to the connecting member, and the other end of the elastic member is fixed to the cover.

9. The cover assembly as claimed in claim 8, wherein the arms of the connecting member are L-shaped.

10. The cover assembly as claimed in claim 8, wherein a C-shaped positioning portion is formed on the backside of the cover, the open part of the C-shaped positioning portion facing away from the cover, the connecting member defines a receiving slot, the post extends from a portion of the connecting member bounding the receiving slot into the receiving slot, the post engages in the open part of the C-shaped positioning portion.

11. The cover assembly as claimed in claim 8, wherein two spaced latching portions are formed on a section of the panel above the opening, each of the latching portions defines a recess, two blocks protrude from the backside of the cover for engaging in the corresponding recesses of the latching portions.

* * * * *